United States Patent [19]

Ettischer et al.

[11] 4,070,684
[45] Jan. 24, 1978

[54] SHUTTER RELEASE BLOCKING DEVICE FOR FOLDABLE CAMERA

[75] Inventors: Helmut Ettischer, Ostfildern; Peter Huschle, Boblingen, both of Germany

[73] Assignee: Eastman Kodak Company, Rochester, N.Y.

[21] Appl. No.: 684,503

[22] Filed: May 7, 1976

[30] Foreign Application Priority Data

July 17, 1975 Germany ............... 2531884

[51] Int. Cl.² ............... G03B 17/52; G03B 17/04; G03B 17/38
[52] U.S. Cl. ............... 354/86; 354/187; 354/208; 354/268
[58] Field of Search ............... 354/207, 208, 268, 86, 354/187

[56] References Cited

U.S. PATENT DOCUMENTS

| | | | |
|---|---|---|---|
| 2,011,895 | 8/1935 | Goldhammer | 354/187 |
| 2,117,971 | 5/1938 | Mihalyi | 354/262 |
| 2,139,759 | 12/1938 | Lindenberg | 354/207 |
| 3,577,900 | 5/1971 | Peterson et al. | 354/207 |
| 3,714,879 | 2/1973 | Land et al. | 354/83 |

FOREIGN PATENT DOCUMENTS

| | | |
|---|---|---|
| 644,612 | 4/1937 | Germany. |
| 1,453,920 | 12/1938 | Germany. |

OTHER PUBLICATIONS

Kodak Instamatic S-10 & S-20, Owner's Manual & Supplement, Mar. 17, 1967.

*Primary Examiner*—L. T. Hix
*Assistant Examiner*—M. L. Gellner
*Attorney, Agent, or Firm*—W. C. Dixon

[57] ABSTRACT

A blocking device in a foldable camera blocks the shutter release button to prevent an undesired exposure whenever the camera is folded and throughout each film transport cycle. The device is moved into blocking relationship with the release button in response to movement of a camera cover member to its closed position and in response to initiation of the transport cycle. The device is then moved out of said blocking relationship upon movement of the cover member from its closed position and upon completion of said cycle. The device includes a pivotable member bearing a blocking element and two sensing elements. One sensing element is actuable by closure of the cover member; the other sensing element is actuable by movement of a timing cam that rotates one revolution in synchronism with the transport cycle. The blocking element moves into the path of the release button whenever either sensing element is actuated. The device is especially useful in a foldable processing camera, wherein the film transport may be motorized.

22 Claims, 6 Drawing Figures

SHUTTER RELEASE BLOCKING DEVICE FOR FOLDABLE CAMERA

BACKGROUND OF THE INVENTION

1. Field of the Invention

The present invention relates generally to photography, and particularly to means in a foldable camera for preventing an exposure whenever the camera is folded and throughout each film transport cycle.

2. Description of the Prior Art

It has long been known to provide a foldable camera with means for preventing the camera shutter from being actuated when the camera is in its folded or closed condition. It has also been known to provide a camera with means for preventing its shutter from being actuated during a film transport cycle.

For example, German Pat. No. 644,612 discloses a reflex camera having a viewfinder cover that is hinged to the camera housing for movement from an open, viewing position to a closed position. As the cover is moved to its closed position, the shutter release member becomes blocked, or locked, to prevent actuation thereof when the viewfinder is not ready for use.

Similarly, U.S. Pat. No. 2,011,895 and German Utility Model No. 1,453,920 each disclose a foldable camera wherein the camera lens mount is movable from an extended, picture-taking position to a retracted, storage position. As the lens mount is moved to its retracted, storage position, the shutter release member becomes blocked to prevent actuation thereof when the camera is folded.

U.S. Pat. No. 2,117,971 also discloses a foldable camera wherein the lens mount is movable from an extended, picture-taking position to a retracted, storage position. The shutter mechanism in this camera is divided into two parts, one part including the shutter leaves and diaphragm, the other part including the mechanism for operating those members. The two parts are operatively engaged only when the lens mount is in its fully extended, picture-taking position. When the lens mount is in any other position, i.e., whenever the camera is not fully unfolded, the two parts are disengaged and the shutter is locked closed to preclude any opening movement thereof. Moreover, when the lens mount is in its fully retracted, storage position, the camera is fully folded and the shutter release member is inaccessible to the user. Also, the camera is provided with a shutter-cocking and film-winding lever which is manually reciprocable away from and back to its rest position against the camera body. The lever can be reciprocated only when the camera is at least partially unfolded. The first stroke of the lever cocks the shutter and starts winding the film. Additional strokes are required to wind the film sufficiently to place its next image area in position for exposure. After completion of the preceding exposure, the shutter release member is blocked until the shutter has been cocked and the lever returned to its rest position. The release member can then be actuated to release the shutter, and thereby effect another exposure, even though the lever has not yet been reciprocated enough times to move the next image area into position for that exposure. Thus, since the shutter release member is not blocked throughout a film transport cycle, any film image area can be exposed more than once.

U.S. Pat. No. 3,577,900 discloses a motorized camera wherein the lens mount is movable from an extended, picture-taking position to a retracted, storage position. In this camera, the externally accessible shutter release member is automatically retracted to its depressed position, without releasing the shutter, when the lens mount is moved to its retracted, storage position. Thus the shutter cannot be operated whenever the lens mount is so positioned. When the lens mount is moved to its extended, picture-taking position, the shutter release member is automatically extended to its operative position. After an unexposed film image area has been moved into position for exposure, the release member can be depressed to release the shutter. Upon automatic return of the release member to its extended position, a double-exposure-prevention mechanism blocks said member, and thereby prevents it from being depressed again, until the next unexposed film image area has been moved into position for exposure. Since the shutter release member is blocked throughout a film transport cycle, any one film image area cannot be exposed more than once. While this camera thus offers an advantage over that described in U.S. Pat. No. 2,117,971, the mechanism provided in this camera for automatically retracting the release member to its depressed position without releasing the shutter when the lens mount is retracted to its storage position, and for automatically blocking the release member to prevent shutter-releasing movement thereof to said depressed position during a film transport cycle, is complex and costly to manufacture.

Of interest also is U.S. Pat. No. 3,714,879, which discloses a foldable, motorized, reflex camera camera of the processing type. This camera is foldable from an erect, picture-taking configuration to a folded, or collapsed, configuration suitable for storing and carrying. At no time is its shutter release member blocked. When the camera is fully folded, its release member is covered and thereby rendered inaccessible. Throughout a film transport cycle the release member, though depressable, is electrically rendered ineffective to operate the camera's electronic shutter. Thus, this camera relies on covering its release member to prevent shutter-operating actuation thereof when the camera is folded, and on electrical control circuitry to prevent the shutter from operating if the release member is actuated during a film transport cycle.

A review of all the prior art discussed above indicates a long-felt but hitherto-unresolved need for a simple and reliable undesired-exposure-prevention device in a foldable camera; a device that automatically and positively prevents shutter operating movement of the camera's shutter operating member both when the camera is folded and throughout each film transport cycle; a device that performs that function without having to move the shutter operating member from its normal, operative position; a device that performs that function without having to cover the shutter operating member or otherwise render it inaccessible; a device that performs that function without having to use electrical or other means for rendering normal movement of said member ineffective to operate the shutter.

SUMMARY OF THE INVENTION

A principal object of the present invention is to fill the aforesaid long-felt but hitherto-unresolved need for a simple and reliable undesired-exposure-prevention device, especially in a foldable camera whose shutter operating member remains externally accessible when the camera is folded.

Another object of the invention is to provide such a device for use particularly in a foldable processing camera whose shutter operating member remains so accessible when the camera is folded.

A further object of the invention is to provide such a device for use more particularly in a foldable motorized processing camera whose shutter operating member remains so accesible.

These and other objects and advantages are realized in a foldable camera constructed in accordance with the present invention. Such a camera comprises: a housing having a wall portion; a cover member movable relative to the housing from an open position wherein the camera is unfolded to a closed position wherein the camera is folded; means in the housing for supporting film at an exposure station; means including an externally accessible member movable from a first position to a second position for effecting an exposure of the film at the exposure station; means drivable through an operating cycle for transporting the film from the exposure station after the exposure has been effected; means operable for driving the transporting means through the operating cycle; an actuating member movable from an initial position through a movement cycle substantially synchronous with the operating cycle; and means for preventing the externally accessible member from moving to its second position when the camera is folded and during the operating cycle, the preventing means including a blocking member movable into blocking relationship with the externally accessible member in response to movement of the cover member to its closed position and in response to movement of the actuating member from its initial position.

The aforementioned objects and advantages are more particularly realized in a foldable camera constructed in accordance with the preferred embodiment of the invention illustrated herein. Such a camera, adapted to effect an exposure and initiate processing of a self-processable film unit, comprises: a housing having a wall portion; a cover member movable relative to the housing from an unfolded-camera position to a folded-camera position overlying the wall portion; means in the housing for supporting the film unit in position for its exposure; an externally accessible member movable from a first position to a second position to effect the exposure, and returnable to its first position, the externally accessible member having an engagement portion that moves along a predetermined path as the externally accessible member moves from its first position to its second position; means drivable through an operating cycle after the exposure has been effected for transporting the film unit from the supporting means and for initiating its processing, the transporting and initiating means including a movable film-engaging member for advancing the film unit from the supporting means and a pair of juxtaposed rotatable rollers defining a nip for receiving the film unit when advanced by the film-engaging member, the operating cycle including both movement of the film-engaging member to advance the film unit from the supporting means and rotation of at least one of the rollers to move the film unit through the nip and thereby initiate the processing; an actuating member having a cam surface thereon and rotatable from an initial position, through a single revolution synchronous with the operating cycle, to its initial position again, the actuating member being initially rotatable from its initial position in response to movement of the externally accessible member from its second position to its first position, and further rotatable through its single revolution as the transporting and initiating means is driven through its operating cycle; means operable for driving the transporting and initiating means through its operating cycle, the driving means including a motor drivingly associated with both the actuating member and the transporting and initiating means, the motor becoming energized in response to rotation of the actuating member from its initial position and remaining energized until the actuating member resumes its initial position, whereby the motor operates to drive the actuating member through its single revolution and the transporting and initiating means through its operating cycle in response to the movement of the externally accessible member from its second position to its first position; and means for preventing the externally accessible member from moving to its second position when the camera is folded and during the operating cycle, the preventing means including a blocking member having an abutment portion movable into the predetermined path in response to movement of the cover member to its folded-camera position and in response to the rotation of the actuating member from its initial position.

It will be seen that the present invention achieves the aforementioned objects thereof, and in so doing provides advantages not found in the prior art. Various means for practicing the invention and other advantages and novel features thereof will become apparent in the detailed description of the illustrated embodiments presented below.

BRIEF DESCRIPTION OF THE DRAWINGS

In the detailed description of the illustrated embodiments presented below, reference is made to the accompanying drawings, wherein like reference numerals denote like elements, and wherein.

DESCRIPTION OF THE ILLUSTRATED EMBODIMENTS

Because certain parts of photographic and related apparatus are well known, the following description is directed in particular to those elements forming, cooperating directly with, or relating to the present invention. Elements that are not specifically shown or described herein are selectable from those known in the art.

THE PREFERRED EMBODIMENT

Figure 1:
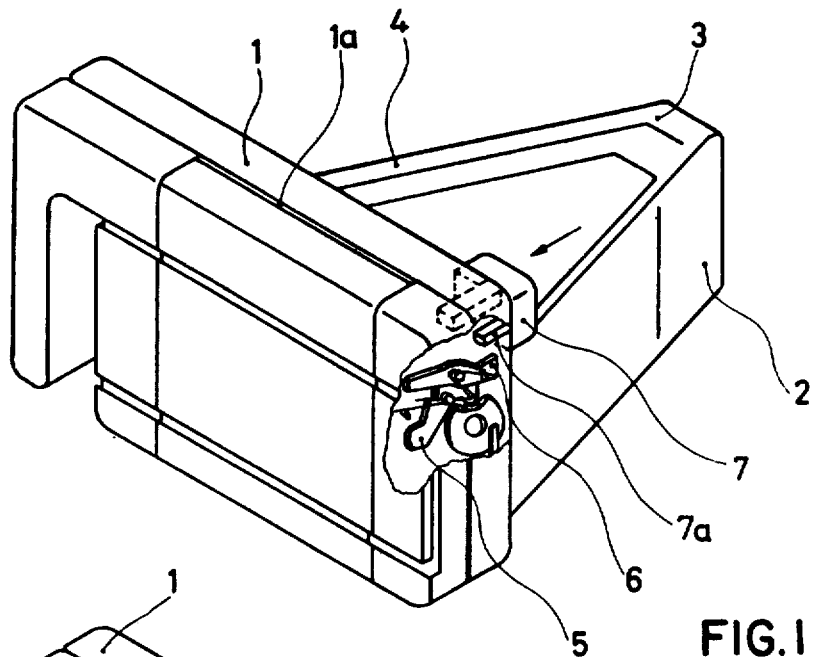
FIG. 1 is a top-right-rear perspective view of a foldable camera constructed in accordance with the preferred embodiment of the present invention, showing the camera in its unfolded, picture-taking configuration.
Figure 2:
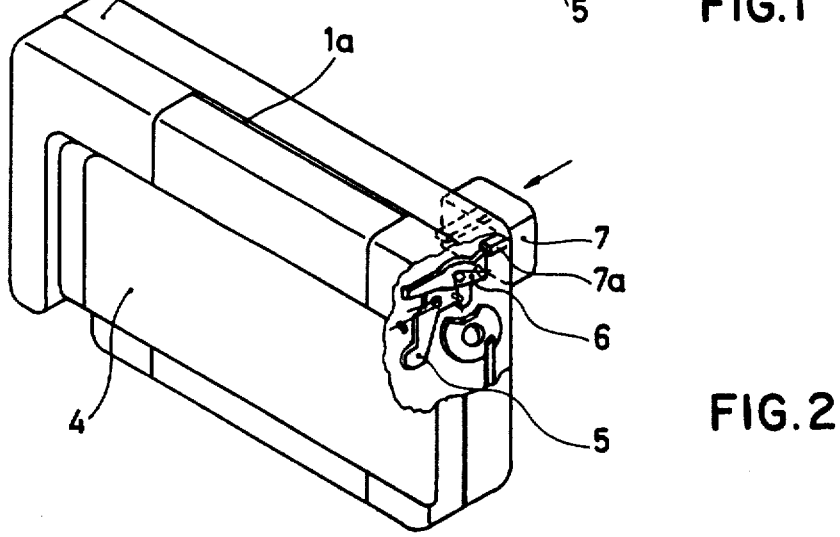
FIG. 2 is a top-right-rear perspective view of the camera of FIG. 1, showing the camera in its folded, storing-and-carrying configuration.

As shown in FIGS. 1 and 2, a bellows cover member 2 is hingedly mounted on camera housing 1. Cover member 2 is integral with lens carrier 3. Another cover member 4 is hingedly mounted on lens carrier 3 and, at its opposite end, is attached to housing 1 so as to be slidable thereon and latchable thereto in the positions shown in FIGS. 1 and 2. In their folded positions shown in FIG. 2, cover members 2 and 4 rest against the front and rear wall portions, respectively, of housing 1 approximately parallel thereto.

Figure 4:
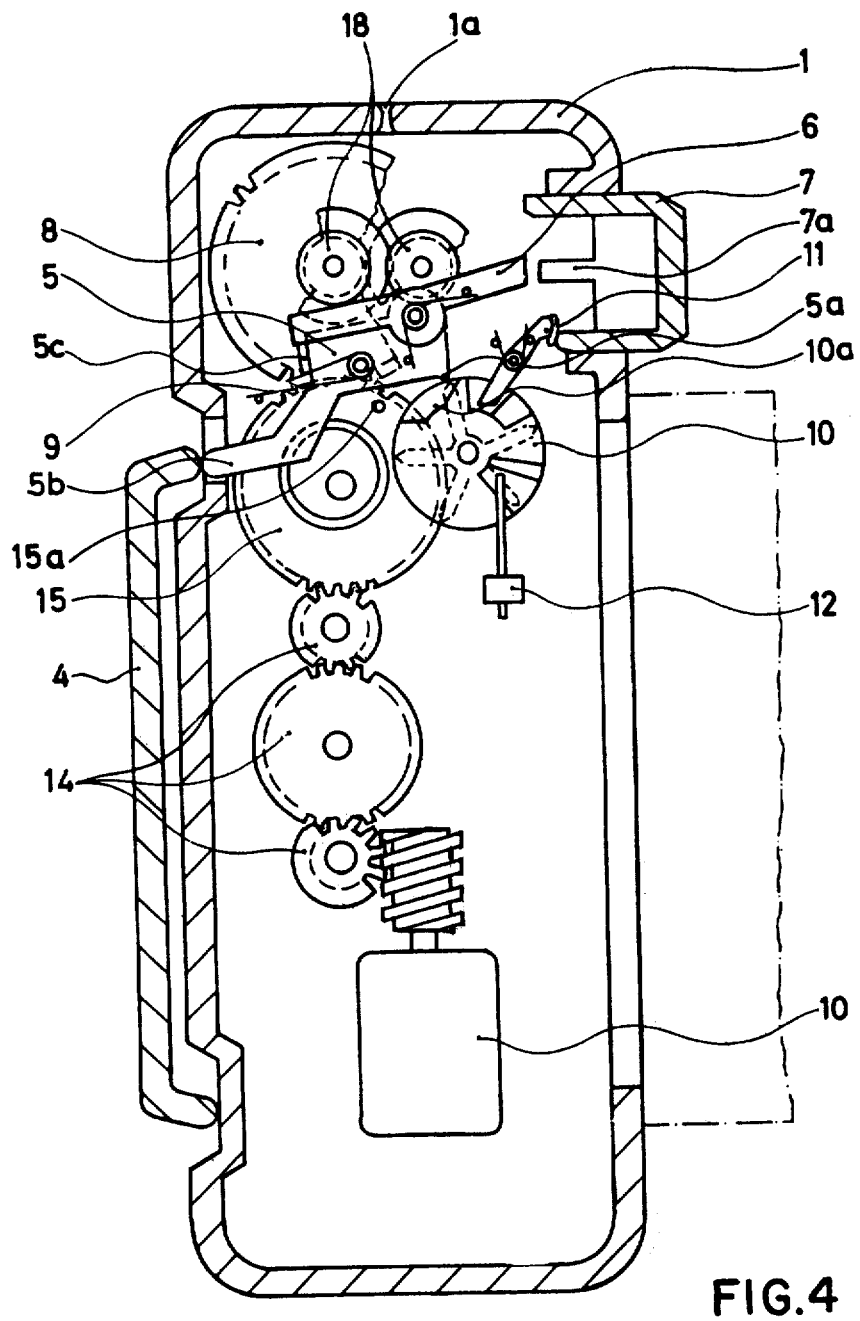
FIG. 4 is a right-side elevational view of a vertical section through the camera of FIG. 1, showing the preferred embodiment of the invention as it appears after the camera has been folded to its storing-and-carrying configuration.

In its folded position shown in FIGS. 2 and 4, cover member 4 is latched to the rear wall portion of housing 1 and exerts pressure on arm 5b of a sensing lever 5 inside the housing. Arm 5b extends through an opening in the rear wall portion of the housing so as to be engageable by cover member 4. The resulting movement of sensing lever 5 causes a blocking lever 6 to be pivoted into the movement path of a projection 7a on externally accessible shutter release button 7, whereby release button 7 is blocked when the camera is folded.

Figure 3:
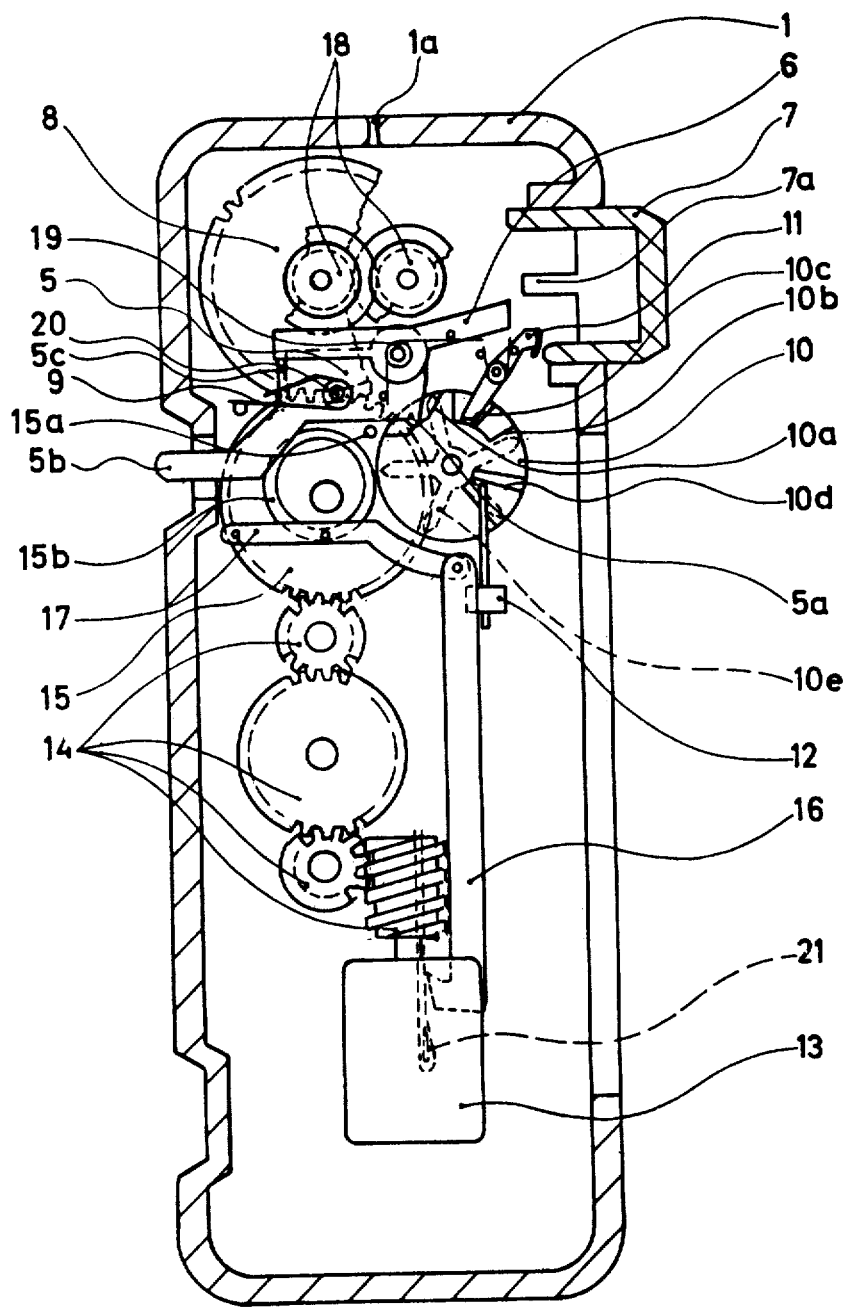
FIG. 3 is a right-side elevational view of a vertical section through the camera of FIG. 1, showing the preferred embodiment of the invention as it appears after the camera has been unfolded to its picture-taking configuration but before the camera operating cycle has commenced.

Further details of the release button blocking means are shown in FIGS. 3 and 4. Sensing lever 5 is mounted for rotation about pivot 20, rigidly connected to the housing, and is urged in a clockwise direction by a spring 9 engaging a projection 5c on lever 5. Blocking lever 6 is mounted for rotation about pivot 19 on lever 5 and is urged counterclockwise against projection 5c by a spring as shown. Blocking lever 6 is so resiliently supported on sensing lever 5 in order to avoid any damage to members 5, 6, 7a should release button 7 be held in its depressed position while cover member 4 is moved to its folded position shown in FIG. 4, inasmuch as blocking lever 6 cannot be pivoted into the movement path of projection 7a while release button 7 is so depressed.

Besides cooperating with cover member 4, sensing lever 5 also cooperates with an indexing wheel 10, in that a projection 5a on lever 5 engages either a recess 10a on wheel 10 or the circumferential surface of wheel 10 as the wheel rotates. Wheel 10 also is provided with a recess 10b having a sawtooth surface 10c. Cooperating with surface 10c is a pivotably mounted lever 11 spring-biased toward release button 7. Another recess 10d on wheel 10 serves to actuate a switch 12 for energizing an electric motor 13. Switch 12 is so designed that it cannot be actuated by recesses 10a and 10b.

Wheel 10 is driven by motor 13 via gears 14 and 15. Gear 15 has on its face a lug 15a, which cooperates with ribs 10e on wheel 10, and a cam groove 15b, which cooperates with a lever 17 adapted to actuate a film-transporting claw 16. Gear 15 is meshed with a gear 8 which drives a pair of juxtaposed film-transporting rollers 18.

The operation of the camera will now be described.

As the camera is unfolded from its storing-and-carrying configuration shown in FIGS. 2 and 4 to its picture-taking configuration shown in FIGS. 1 and 3, cover member 4 is disengaged from arm 5b of sensing lever 5. Sensing lever 5 and blocking lever 6 then occupy their positions illustrated in FIG. 3, wherein release button 7 is not blocked.

Figure 5:
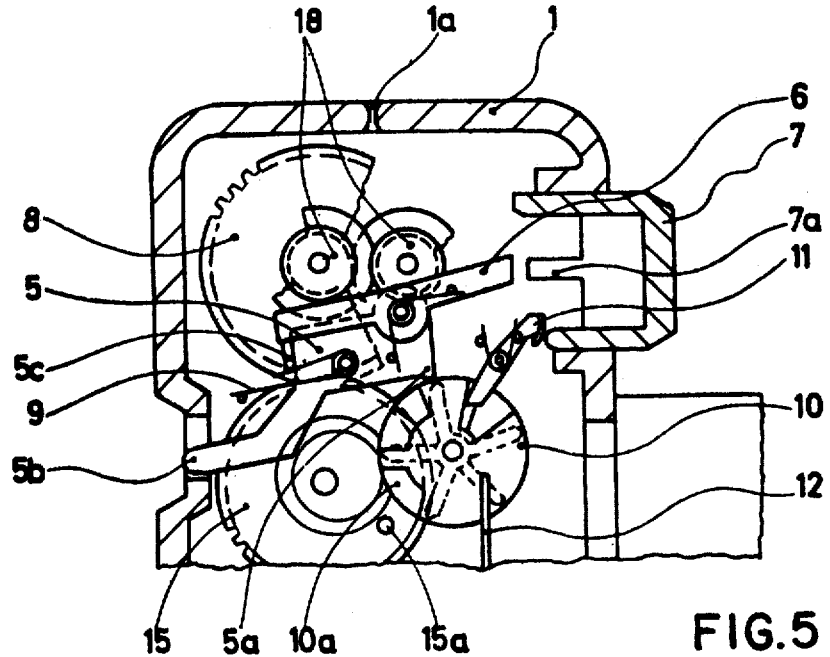
FIG. 5 is a partial right-side elevational view of a vertical section through the camera of FIG. 1, showing the preferred embodiment of the invention as it appears after the camera has been unfolded to its picture-taking configuration and after the camera operating cycle has commenced.

If an exposure is now to be effected, release button 7 is depressed and the camera shutter thereby actuated via transmission members not shown. At the same time, lever 11 is pivoted counterclockwise, its lower end sliding rightward over the sawtooth surface 10c. When pressure is relieved from release button 7, lever 11 is pivoted clockwise by its return spring, thereby rotating wheel 10 counterclockwise. Sensing lever 5 is thereupon pivoted counterclockwise as its projection 5a is cammed out of recess 10a, causing blocking lever 6 to be pivoted into the movement path of projection 7a and thus into blocking relationship with release button 7, as shown in FIG. 5. At the same time, switch 12 is closed and motor 13 thereby energized.

Motor 13 now drives gears 14, 15, and 8. During each revolution of gear 15, lug 15a thereon indexes wheel 10 by striking a succeeding one of its ribs 10e.

During the first revolution of gear 15, cam groove 15b thereon reciprocates claw 16 once, causing the claw to advance the exposed film unit 21 from its cartridge (not shown) to the nip of rollers 18. While claw 16 undergoes this movement, the camera shutter is re-cocked by means not shown. Upon completion of the first revolution of gear 15, claw 16 is uncoupled by means not shown. During subsequent revolutions of gear 15, lug 15a indexes wheel 10 further, and rollers 18 eject film unit 21 from the camera through an exit slot 1a.

Another exposure must not be effected until the already-exposed film unit has been ejected. Such undesired exposure is prevented in that release button 7 remains blocked throughout the film transport cycle, which is synchronous with the revolution of wheel 10. The movements of blocking lever 6 and release button projection 7a are so coordinated that, when the camera is folded, the blocking relationship is effective when release button 7 is initially depressed, i.e., before lever 11 moves over the sawtooth surface 10c.

Only when wheel 10 has completed one revolution can sensing lever projection 5a reenter wheel recess 10a, thereby withdrawing blocking lever 6 from the movement path of projection 7a to permit another actuation of release button 7. At the same time, switch 12 reenters wheel recess 10d, causing switch to open and thereby deenergize motor 13. The camera is now ready for another exposure and film-transport cycle.

AN ALTERNATIVE EMBODIMENT

Figure 6:
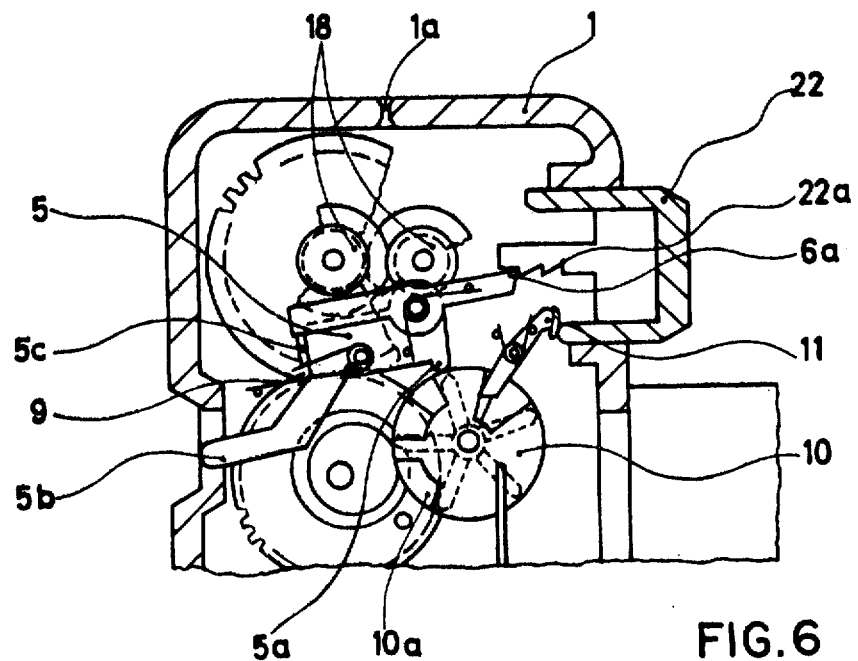
FIG. 6 is a partial right-side elevational view of a vertical section through a foldable camera constructed in accordance with an alternative embodiment of the present invention, showing the alternative embodiment as it appears after the camera has been unfolded to its picture-taking configuration and after the camera operating cycle has commenced.

In the alternative embodiment shown in FIG. 6, blocking lever 6 has a blocking nose 6a which comes into engagement with blocking teeth 22a on release button 22. An advantage of this embodiment is that release button 22 is prevented from being depressed again immediately after it has started to move back toward its initial position. Thus, when the camera has been folded to its storing-and-carrying configuration by moving cover members 2 and 4 against housing 1, and whenever a film-transport cycle has been initiated, the release button blocking means here shown is immediately effective to prevent an undesired exposure.

In both embodiments, the release button blocking means of the present invention not only prevents such undesired exposure but it also permits uninterrupted completion of an operating cycle once the cycle has commenced.

The invention has been described in detail with particular reference to the illustrated preferred and alternative embodiments thereof, but it will be understood that variations and modifications can be effected within the spirit and scope of the invention.

What is claimed is:

1. A foldable camera comprising:
   a. a housing having a wall portion;
   b. a cover member movable relative to said housing from an open position wherein the camera is unfolded to a closed position wherein the camera is folded;
   c. means in said housing for supporting film at an exposure station;
   d. means including an externally accessible member movable from a first position to a second position for effecting an exposure of the film at said exposure station;
   e. means drivable through an operating cycle for transporting the film from said exposure station after the exposure has been effected;
   f. means operable for driving said transporting means through said operating cycle;
   g. an actuating member movable from an initial position through a movement cycle substantially synchronous with said operating cycle; and
   h. means for preventing said externally accessible member from moving to said second position when the camera is folded and during said operating cycle, said preventing means including a blocking member movable into blocking relationship with said externally accessible member in response to movement of said cover member to said closed position and in response to movement of said actuating member from said initial position.

2. A foldable camera as claimed in claim 1 wherein said blocking member remains in said blocking relationship so long as said cover member is in said closed position and so long as said actuating member is in a position other than said initial position.

3. A foldable camera as claimed in claim 1 wherein said blocking member is movable out of said blocking relationship in response to movement of said cover member from said closed position and in response to movement of said actuating member to said initial position.

4. A foldable camera as claimed in claim 1 wherein said externally accessible member includes an engagement portion movable along a predetermined path as said externally accessible member moves from said first position to said second position; and wherein said blocking member includes an abutment portion movable into and out of said path, respectively, as said blocking member moves into and out of said blocking relationship.

5. A foldable camera as claimed in claim 1 wherein said transporting means includes a pair of rotatable rollers juxtaposed to define a nip and a movable film-engaging member adapted to advance the film from said exposure station to said nip; and wherein said operating cycle includes both movement of said filmengaging member to advance the film from said station to said nip and rotation of at least one of said rollers to move the film through said nip.

6. A foldable camera as claimed in claim 5 wherein said actuating member comprises a rotatable member having a cam surface thereon; and wherein said movement cycle comprises one revolution of said rotatable member beginning and ending at said initial position.

7. A foldable camera as claimed in claim 6 wherein said blocking member is movable into said blocking relationship by said cam surface in response to rotation of said rotatable member from said initial position.

8. A foldable camera as claimed in claim 7 wherein said preventing means further includes biasing means for moving said blocking member out of said blocking relationship in response to rotation of said rotatable member to said initial position.

9. A foldable camera as claimed in claim 6 wherein said rotatable member is initially rotated out of said initial position in response to movement of said externally accessible member from said second position to said first position, and is further rotated through said one revolution in response to operation of said driving means.

10. A foldable camera as claimed in claim 9 wherein said driving means includes a motor drivingly associated with both said rotatable member and said transporting means; and wherein said motor becomes energized in response to rotation of said rotatable member out of said initial position and remains energized until said rotatable member resumes said initial position; whereby said motor operates to drive said rotatable member through said one revolution and said transporting means through said operating cycle in response to said movement of said externally accessible member from said second position to said first position.

11. A foldable camera as claimed in claim 1 wherein said preventing means further includes a motion transmitting member supporting said blocking member and having first and second sensing portions, said motion transmitting member being mounted for movement from a rest position wherein said blocking member is not in said blocking relationship to a moved position wherein said blocking member is in said blocking relationship, said first sensing portion being disposed for actuation by said cover member upon said movement of said cover member to said closed position to effect said movement of said motion transmitting member to said moved position, said second sensing portion being disposed for actuation by said actuating member upon said movement of said actuating member from said initial position to effect said movement of said motion transmitting member to said moved position.

12. A foldable camera as claimed in claim 11 wherein said wall portion of said housing includes means defining an opening therein; wherein said first sensing portion is disposed in said opening when said motion transmitting member is in said rest position; wherein said cover member overlies said wall portion when in said closed position; and wherein said cover member is moved into actuating engagement with said first sensing portion, when said motion transmitting member is in said rest position, upon said movement of said cover member to said closed position.

13. A foldable camera as claimed in claim 11 wherein said motion transmitting member is mounted for rotational movement from said rest position to said moved position.

14. A foldable camera as claimed in claim 13 wherein said motion transmitting member supports said blocking member for rotational movement relative to said motion transmitting member in a direction away from said blocking relationship.

15. A foldable camera as claimed in claim 11 wherein said motion transmitting member supports said blocking member for movement relative to said motion transmitting member in a direction away from said blocking relationship to permit said movement of said motion transmitting member to said moved position to be effected without interference when said externally accessible member is in said second position.

16. A foldable camera as claimed in claim 15 wherein said preventing means further includes means for biasing said motion transmitting member toward said rest position and means for biasing said blocking member relative to said motion transmitting member in a direction toward said blocking relationship.

17. A foldable camera as claimed in claim 16 wherein said preventing means further includes means for maintaining said blocking member out of said blocking relationship when said motion transmitting member is in said rest position.

18. A foldable camera adapted to effect an exposure and initiate processing of a self-processable film unit, said camera comprising:
  a. a housing having a wall portion;
  b. a cover member movable relative to said housing from an unfolded-camera position to a folded-camera position overlying said wall portion;
  c. means in said housing for supporting the film unit in position for the exposure;
  d. an externally accessible member movable from a first position to a second position to effect the exposure and returnable to said first position, said externally accessible member having an engagement portion that moves along a predetermined path as said externally accessible member moves from said first position to said second position;
  e. means drivable through an operating cycle after the exposure has been effected for transporting the film unit from said supporting means and for initiating the processing, said transporting and initiating means including a movable film-engaging member for advancing the film unit from said supporting means and a pair of juxtaposed rotatable rollers defining a nip for receiving the film unit when advanced by said film-engaging member, said operating cycle including both movement of said film-engaging member to advance the film unit from said supporting means and rotation of at least one of said rollers to move the film unit through said nip and thereby initiate the processing;
  f. an actuating member having a cam surface thereon and rotatable from an initial position, through a single revolution synchronous with said operating cycle, to said initial position again, said actuating member being initially rotatable from said initial position in response to movement of said externally accessible member from said second position to said first position and further rotatable through said single revolution as said transporting and initiating means is driven through said operating cycle;
  g. means operable for driving said transporting and initiating means through said operating cycle, said driving means including a motor drivingly associated with both said actuating member and said transporting and initiating means, said motor becoming energized in response to rotation of said actuating member from said initial position and remaining energized until said actuating member resumes said initial position, whereby said motor operates to drive said actuating member through said single revolution and said transporting and initiating means through said operating cycle in response to said movement of said externally accessible member from said second position to said first position; and
  h. means for preventing said externally accessible member from moving to said second position when said camera is folded and during said operating cycle, said preventing means including a blocking member having an abutment portion movable into said predetermined path in response to movement of said cover member to said folded-camera position and in response to said rotation of said actuating member from said initial position.

19. A foldable camera as claimed in claim 18 wherein said preventing means further includes a motion transmitting member operatively associated with said blocking member and having first and second sensing portions, said motion transmitting member being mounted for pivotal movement from a rest position locating said abutment portion outside said path to a moved position locating said abutment portion in said path, said first sensing portion being disposed, when said motion transmitting member is in said rest position, to sense said movement of said cover member to said folded-camera position and thereby effect said movement of said motion transmitting member to said moved position, said second sensing portion being disposed, when said motion transmitting member is in said rest position, to sense said rotation of said actuating member from said initial position and thereby effect said movement of said motion transmitting member to said moved position.

20. A foldable camera as claimed in claim 19 wherein said wall portion includes means defining an opening; wherein said cover member includes an engaging portion that moves into alignment with said opening as said cover member moves to said folded-camera position; wherein, when said motion transmitting member is in said rest position, said first sensing portion is disposed in said opening for actuation by said engaging portion, upon said movement of said cover member to said folded-camera position, to effect said movement of said motion transmitting member to said moved position; and wherein, when said motion transmitting member is in said rest position, said second sensing portion is disposed adjacent to said actuating member for actuation by said cam surface, upon said rotation of said actuating member from said initial position, to effect said movement of said motion transmitting member to said moved position.

21. A foldable camera as claimed in claim 20 wherein said motion transmitting member supports said blocking member for pivotal relative movement thereof urging said abutment portion away from said path, to permit said movement of said motion transmitting member to said moved position to be effected without interference when said externally accessible member is in said second position.

22. A foldable camera as claimed in claim 21 wherein said preventing means further includes means for biasing said blocking member in a direction urging said abutment portion toward said path, means for biasing said motion transmitting member toward said rest position, and means cooperating with said blocking member for maintaining said abutment portion out of said path when said motion transmitting member is in said rest position.

* * * * *